United States Patent [19]

Holzer et al.

[11] Patent Number: 5,362,554
[45] Date of Patent: Nov. 8, 1994

[54] HIGH TEMPERATURE LABEL

[75] Inventors: Mark R. Holzer, Woodbury; Roger W. Lange, Maplewood, both of Minn.

[73] Assignee: Minnesota Mining and Manufacturing Company, St. Paul, Minn.

[21] Appl. No.: 927,821

[22] Filed: Aug. 10, 1992

[51] Int. Cl.$^5$ ................................................. B32B 5/16
[52] U.S. Cl. .................................... 428/283; 428/285; 428/325; 428/328; 428/402; 428/406; 428/408; 428/902; 428/914
[58] Field of Search ................ 428/283, 284, 408, 402, 428/406, 268, 285, 241, 914, 325, 328

[56] References Cited

U.S. PATENT DOCUMENTS

| | | | |
|---|---|---|---|
| 3,175,937 | 3/1965 | Bayer et al. | 156/89 |
| 3,372,852 | 3/1968 | Cornell | 228/50 |
| 3,615,276 | 10/1971 | Singleton | 29/195 |
| 3,669,787 | 6/1972 | Cornell | 161/167 |
| 3,852,148 | 12/1974 | Pryor et al. | 161/41 |
| 4,301,726 | 11/1981 | Sato et al. | 101/129 |
| 4,915,994 | 4/1990 | Begelfer et al. | 428/40 |
| 5,008,151 | 4/1991 | Tominaga et al. | 428/343 |

FOREIGN PATENT DOCUMENTS 53-82299  7/1978  Japan .
2-131931  5/1990  Japan .

OTHER PUBLICATIONS

*Encyclopedia of Chemical Technology*, Kirk–Othmer, Third Edition, vol. 11, pp. 807–817, John Wiley & Sons (1980).
*Encyclopedia of Materials Science and Engineering*, vol. 3, pp. 1958–1965, The MIT Press (1986).
World Patents Index (WPI), Derwent Publications, Ltd., Japanese Kokai JP 53082299.

*Primary Examiner*—James J. Bell
*Attorney, Agent, or Firm*—Gary L. Griswold; Walter N. Kirn; Lucy C. Weiss

[57] ABSTRACT

An article suitable for use in bonding to metal, glass, or ceramic substrates at high temperatures, e.g., above about 400° C, comprises (a) a thermally stable backing material, such as a metal foil or an inorganic fabric; and (b) a coating on at least a portion of at least one major surface of the backing material, the coating consisting essentially of fused or fusible particles selected from glass particles, ceramic particles, and mixtures thereof. Preferably, the coating further contains a non-pressure sensitive adhesive vehicle such as pine oil, to aid in application and retention of the particles.

22 Claims, No Drawings

HIGH TEMPERATURE LABEL

FIELD OF THE INVENTION

This invention relates to labels and tapes for use at high temperatures, e.g., temperatures above about 400° C.

BACKGROUND OF THE INVENTION

The tracking of parts and products in a manufacturing operation requires a means of marking or labeling them in order that they can be readily and accurately identified and tracked. In the steel industry, the parts or products are often labeled at temperatures well above ambient temperature, e.g., at temperatures above about 400° C. This necessitates the use of markings or labels which can be attached and will maintain their integrity at such temperatures. High temperature-resistant paint, crayon, and chalk are currently used for marking hot steel coils, but these markings are generally handwritten, can degrade with time, and thus may not be consistently legible. Moreover, such markings are not machine-readable and thus are not adaptable to computer scanning and tracking methods. Although heat-resistant metal tags can be imprinted with machine-readable bar codes, the tags currently require attachment by mechanical means such as nails, rivets, or screws, which can cause damage to the substrate. Wire attachment of the metal tags is also possible. However, the wire is apt to be broken off during handling, causing the tag to become disconnected from the part. U.S. Pat. No. 4,301,726 (Sato et al.) describes a stencil method for marking hot material, but this method tends to be cumbersome and expensive. Thus, there is a need for a high temperature-resistant label which is conveniently and durably attachable, and which is capable of displaying machine-readable bar codes or other such printed information.

Heat-resistant labels have been described which use various different types of adhesives, including pressure-sensitive adhesives (PSAs), as the means for attachment to a part. PSAs enable easy label attachment but do not possess sufficient high temperature stability for certain applications.

Japanese Patent Application No. 2-131931 (FSK K.K.), published May 21, 1990, describes a ceramic label which is said to be useful as a display label under high temperature conditions. The ceramic label is characterized as a paper-form material which is coated with a mixture of a pressure-sensitive adhesive and an oxide solder composed of oxides such as PbO, ZnO, or $B_2O_3$.

U.S. Pat. No. 5,008,151 (Tominaga et al.) discloses a glass powder adhesive sheet which can be used as a heat-resistant label. This glass powder adhesive sheet comprises a glass powder molding layer comprising a glass powder, a resin binder, and, if necessary, inorganic powder and/or metal powder, and an adhesive layer having a thermal decomposition initiation temperature higher than that of the resin binder. The preferred materials for the adhesive layer are those having pressure-sensitive adhesive properties at room temperature.

A welding backup tape is described in U.S. Pat. No. 3,372,852 (Cornell). The tape comprises a backing coated with adhesive, preferably a heat-resistant pressure-sensitive adhesive, and having a flexible strip of refractory material adhered to a central portion of the adhesive-coated side of the backing. The refractory material comprises refractory particles and an organic binder. During a welding operation, the refractory strip is positioned over the seam to be formed and functions as a backing means which has very good heat resistance and which is sufficiently gas permeable to permit gases produced in the welding operation to escape therethrough. The tape can be removed readily from the metal after the welding operation is completed.

Both metal and glass have been used in various types of applications for bonding to metal and ceramic surfaces. For example, the *Encyclopedia of Materials Science and Engineering*, Volume 3, pages 1958–65, The MIT Press (1986), states that oxide mixtures such as glass are widely used as bonding agents for joining ceramics and for forming ceramic-to-metal seals in the fabrication of electron tubes, magnetic recorder heads, high-pressure alkali vapor lamps, and high-voltage feedthroughs.

U.S. Pat. No. 3,175,937 (Bayer et al.) describes a method of bonding metals using compositions comprising glass powder, a compound which is capable of supplying metal ions to the glass, and/or an oxidation-resistant metal powder.

U.S. Pat. No. 3,615,276 (Singleton) discloses a protected metal article comprising a core of sheet steel which is coated with a protective metal consisting essentially of zinc and which has a fibrous glass cloth impressed into the protective metal coating.

U.S. Pat. No. 3,669,787 (Cornell) describes a flexible, deformable self-supporting glass frit sealing tape useful in joining glass or other inorganic substrates. The tape comprises a sheet material formed from glass frit bonded with a minor amount of heat-depolymerizable rubbery polymer, preferably coated on one or both surfaces with a small amount of similarly depolymerizable pressure-sensitive adhesive.

SUMMARY OF THE INVENTION

Briefly, this invention provides a label suitable for use in bonding to metal, glass, or ceramic substrates at high temperatures, e.g., temperatures above about 400° C. The high temperature label of the invention comprises (a) a sheet material which is thermally stable at its application temperature; and (b) a coating on at least a portion of at least one major surface of the sheet material, the coating consisting essentially of fused or fusible particles selected from the group consisting of glass particles, ceramic particles, and mixtures thereof. As used herein, the term "particles" refers to particulate materials which can be either regular or irregular in shape, e.g., flakes, fibers, microspheres (solid or hollow), powders, and the like can be utilized. Preferably, the coating further contains a non-pressure sensitive adhesive vehicle, e.g., pine oil, to aid in application of the particles to, and retention thereof by, the sheet material. The term "non-pressure sensitive adhesive," as used herein, means that the vehicle does not possess the fourfold balance of adhesion, cohesion, stretchiness, and elasticity which is characteristic of pressure sensitive adhesives.

This invention also provides a high temperature tape (and a roll thereof) comprising (a) a flexible, elongate backing material which is thermally stable at its application temperature; and (b) a coating on at least a portion of at least one major surface of the backing material, the coating consisting essentially of fused or fusible particles selected from the group described above. High temperature labels and tapes borne on liners, e.g., pressure sensitive adhesive-coated liners, are further provided, along with a method of high temperature labeling.

The high temperature labels and tapes of the invention can be conveniently applied to metal, glass, or ceramic substrates at high temperatures without damaging the substrate, and, under such temperature conditions, retain both dimensional integrity and, if printed using high temperature-resistant printing inks, integrity of image. The labels and tapes provide durably-bonded identification means which can be printed with bar codes or other machine-readable information, so as to be readily adaptable to the computer scanning and tracking of parts or products in production systems.

DETAILED DESCRIPTION OF THE INVENTION

The high temperature labels and tapes of the invention are prepared by applying a coating consisting essentially of fusible glass or ceramic particles (or a mixture of the two) to a backing. The backing can be in the form of a sheet material or a flexible, elongate material and is thermally stable at its application temperature, e.g., temperatures above about 400° C. If desired, the particles can be fused after application to the backing, but before use, by exposure to a temperature sufficient to effect softening and fusion of the particles.

Fusible particles suitable for use according to the invention are those which are capable of softening and fusing at the application temperature for a particular application. For temperatures ranging from about 400° C. to about 850° C., glass particles such as lead aluminoborosilicate, lead borosilicate, bismuth borosilicate, lead borate, zinc borosilicate, and mixtures thereof can be utilized. Glass is defined and described in *Encyclopedia of Chemical Technology*, Kirk-Othmer, Third Edition, Volume 11, pages 807–17, John Wiley & Sons (1980). At very high temperatures, e.g., temperatures above about 800° C., ceramic particles such as alumina, zirconia, titania, silicon carbide, aluminum nitride, and mixtures thereof are useful. Glass particles and mixtures of glass particles and ceramic particles are generally preferred for use in the invention, as they are capable of softening and fusing under commonly-encountered high temperature conditions. Powders having a wide working temperature or use range, e.g., glass powders (sometimes called glass fluxes or glass frits) such as lead borosilicate which are capable of softening and fusing over a range of about 400° C., are most preferred because of the variability in use or application temperatures under manufacturing conditions. Generally, powders having particle sizes of less than about 50 micrometers function best in the invention, as these generally provide better fluxing and bonding, but powders having larger particle sizes can also be utilized.

To form the labels and tapes of the invention, the fusible particles can be applied to the backing by any method which results in transfer of the particles to, and retention thereof by, the backing. For example, the particles can be dusted or electrostatically sprayed over the surface of the backing and then embedded in it by rolling. Preferably, however, the particles are combined with a non-pressure sensitive adhesive vehicle to aid in the application of the particles by conventional coating methods such as knife coating, roll coating, silk screening, or extrusion. Such vehicles enable the particles to be applied to the backing in a desired thickness or pattern and to be retained thereon. The vehicles can be tacky or tackified, e.g., to aid in attachment of the label to a liner, but do not possess the fourfold balance of adhesion, cohesion, stretchiness, and elasticity which is characteristic of pressure sensitive adhesives.

Preferred vehicles for use according to the invention are organic materials which burn out or decompose at or below the label's application temperature, leaving little or no residue. Materials such as methyl cellulose, polyvinyl alcohol, polyvinyl pyrrolidone, polyethylene glycol, pine oil, hot melt waxes, organic salts (such as dioctyl sodium sulfosuccinate), and the like can be used as the vehicle. Mixtures of these are also useful. Pine oil, for example, burns out cleanly and provides good coating characteristics. Hot melt waxes can be melted prior to combination with the fusible particles. Vehicles such as methyl cellulose, polyvinyl alcohol, and polyvinyl pyrrolidone are generally obtained as solids and can be dispersed in water or water/alcohol solutions to a desired viscosity. Pre-mixed dispersions, such as dioctyl sodium sulfosuccinate in butyl carbinol (product number RD-016, available from Ciba Geigy Pigments Division, Hawthorne, N.Y.), can also be utilized. Although a reasonably complete burn-out of the vehicle is generally desirable, the presence of some residue, for example, residual elements such as sodium, potassium, or boron, can enhance the softening and fusion of the fusible particles.

Suitable ratios of the vehicle to the fusible particles are those which provide viscosities appropriate for a particular method of application of the vehicle/particles combination to the backing and which enable retention of the integrity of the applied combination after solvent evaporation. The viscosity of the combination can be easily adjusted by varying this ratio in order to optimize the combination for use with certain types of coating equipment or to accommodate different particle sizes and/or densities of particles. For example, when coating by knife, bar, or roll methods, a vehicle:particles ratio of about 1:3 is useful and provides good coating characteristics. Vehicle:particles ratios ranging from 0:1 to about 10:1 are generally preferred.

If desired, the coatings utilized in the invention can further comprise additives such as fluxing compounds (which cause glass to flow at lower temperatures) or viscosity adjusters (e.g., mixtures of boric acid, sodium or potassium hydroxide, and potassium silicate), theology modifiers (such as fumed silica), wetting agents, dispersing agents, microbicides, and the like. The coating composition can be mixed or stirred prior to application to the backing by conventional mixing or stirring methods such as those used in the paint industry, e.g., by roll milling. Following application of the coating, the resulting coated backing is preferably dried for a short period of time at a temperature above ambient temperature, e.g., for about 30 minutes at a temperature of from about 60° C. to about 90° C., in order to remove any volatile liquids. The particular vehicle utilized will dictate the preferred conditions. The dried, coated material can then be cut or slit into labels or tapes of the appropriate size and shape for a particular application (after optional lamination to a liner, e.g., pressure sensitive adhesive-coated liner, for ease of handling, etc.).

Backing materials suitable for use in the invention are thermally stable at the application temperature for a particular application. For use at temperatures above about 400° C., such materials include metal foils (e.g., aluminum and aluminum alloys such as 1100 and 1145, copper and copper alloys such as brasses, and iron alloys such as stainless steels and Inconel ™ foils (available from Huntington Alloys, Huntington, W. Va.; believed to be alloys of nickel, chromium, and iron)) and inorganic fabrics (e.g., fiberglass fabric, carbon fabric, and ceramic fabrics formed from aluminoborosilicate fibers, aluminosilicate fibers, alumina fibers, and mixtures thereof). Useful metal foils generally range from about 50 micrometers to about 800 micrometers (about 0.002 inches to about 0.032 inches) in thickness. It may be desirable to clean or degrease the foils prior to use, in order to remove oils or other contaminants which may be detrimental to bonding. Woven fiberglass or ceramic fabric can be chosen from a variety of commercially available weaves, thicknesses, and weights, but generally the finer weaves are preferred for use in the invention and provide labels and tapes which exhibit good adhesion to metal, glass, or ceramic substrates. Chopped fiberglass mats or other nonwoven fabrics or papers can also be used but may lack strength, possibly giving rise to distortion during handling or coating procedures.

Conformable foil or fabric is generally preferred for use in the invention, due to its adaptability to variously-shaped substrates. Thus, it may be desirable to pretreat a chosen fabric to remove any sizing or stiffener which may have been applied during manufacture to improve the handleability of the fibers during weaving. Sizings are typically organic coatings which are generally easily removed by heat pretreatment at a temperature of about 500° C. for about 15 to 30 minutes.

Printable foil or fabric is also generally preferred for use according to the invention, due to its capability of displaying bar codes and other printed information for identification purposes. Such printability can be inherent (the printability of fabrics typically varies according to weave) or can be achieved by means of a surface coating or other surface treatment. Suitable printing inks are those which are stable at the application temperature. Thus, carbon-based inks and other inorganic pigments, as well as color-containing glass or ceramic particles, reflective microspheres, and the like, are preferred marking media, as they typically provide printed or written images which maintain their integrity at higher temperatures. Nonprintable fabrics are also useful and can serve as identification means through variation in label or tape size, color, shape, etc.

Aluminum foil and fiberglass fabric are preferred sheet or backing materials for use in the invention, as they are not only both conformable and printable (when appropriate thicknesses or weaves, etc., are chosen), but are also easy to coat and handle. Aluminum, however, melts at about 600° C. and may therefore be less suitable for use at temperatures substantially higher than 600° C.

The articles of the invention can be bonded to metal, glass, or ceramic substrates at high temperatures, e.g., temperatures above about 400° C. The level of adhesion achieved will vary depending upon various factors, e.g., the coarseness or fineness of the weave of fabric utilized as the backing, the amount of fusible particles utilized, the roughness of the substrate surface, and the application temperature. Since the articles can be applied at high temperature, adhere to the substrate upon cooling, and generally cannot be removed without destroying the label, they provide a convenient and essentially permanent means of identifying metal, glass, or ceramic items which are necessarily or preferably labeled at high temperature. Thus, the articles in the form of labels and tapes can be used for the high temperature labeling of steel coils, billets, castings, ceramic parts, and the like. If both low and high temperature bonding capability is desired, the labels and tapes can be further coated on at least a portion of at least one fusible particle-bearing surface with a material which functions as a heat-activatable adhesive or as a pressure sensitive adhesive at temperatures below the softening point of the fusible particles.

This invention is further illustrated by the following examples, but the particular materials and amounts thereof recited in these examples, as well as other conditions and details, should not be construed to unduly limit this invention.

EXAMPLES

Examples 1-12

These examples describe the preparation of high temperature labels or tapes by applying a coating of lead borate or lead borosilicate glass powder and pine oil to fiberglass fabric. Label application to stainless steel is also described.

Coating compositions were prepared by adding pine oil to two glass powders available from Specialty Glass, Inc. (Oldsmar, Fla.), SP-1494 (having a nominal composition of 87.5% PbO and 12.5% $B_2O_3$ by weight) and SP-1826 (having a nominal composition of 87% PbO, 12% $B_2O_3$, and 1% $SiO_2$ by weight). The pine oil (trade designation Thompson ™ Squeegee Oil, available from Thompson Enamel Co., Bellevue, Ky., or Drakolene ™ Squeegee Oil, available from Ciba-Geigy Corp., Hawthorne, N.Y.) was added to the dry powder in vehicle:powder ratios of 1:2 and 1:3 as shown in Table 1:

TABLE 1

| | Glass Powders with Pine Oil Vehicle on 316 Stainless Steel | | | | | | |
|---|---|---|---|---|---|---|---|
| | | Amt of | Amt of | Thickness of | | Drying Conditions | |
| | Powder | Powder | Vehicle | Wet Coating | | Temp | Temp | Time |
| Ex. | Type | (g) | (g) | (mils) | (μm) | (°F.) | (°C.) | (min) |
| 1 | SP-1826 | 57 | 28.5 | 10 | 254 | 250 | 121 | 20 |
| 2 | SP-1826 | 57 | 28.5 | 15 | 381 | 200 | 93 | 30 |
| 3 | SP-1826 | 57 | 28.5 | 20 | 508 | 175 | 79 | 45 |
| 4 | SP-1826 | 54 | 18 | 10 | 254 | 250 | 121 | 20 |
| 5 | SP-1826 | 54 | 18 | 15 | 381 | 200 | 93 | 30 |
| 6 | SP-1826 | 54 | 18 | 20 | 508 | 175 | 79 | 45 |
| 7 | SP-1494 | 90 | 45 | 10 | 254 | 250 | 121 | 20 |
| 8 | SP-1494 | 90 | 45 | 15 | 381 | 200 | 93 | 30 |
| 9 | SP-1494 | 90 | 45 | 20 | 508 | 175 | 79 | 45 |
| 10 | SP-1494 | 90 | 30 | 10 | 254 | 250 | 121 | 20 |
| 11 | SP-1494 | 90 | 30 | 15 | 381 | 200 | 93 | 30 |
| 12 | SP-1494 | 90 | 30 | 20 | 508 | 175 | 79 | 45 |

The resulting combinations were mixed by hand to give compositions having the consistency of paint. The compositions were roll milled (in a 4-ounce (118 mL) glass jar with several 0.5 inch (1.3 cm) glass beads) slowly overnight and were then knife coated onto one side of three individual webs (4 inches (10.16 cm) wide) of unsized fiberglass cloth (trade designation 28-T greige cloth from BGF Industries, Altavista, Va.) to give wet coating thicknesses of 10, 15, and 20 mils (250, 375, and 500 micrometers) respectively, as indicated in Table 1. The fiberglass (28-T) is an "E" glass fabric having a nominal composition of 52–56% $SiO_2$, 16–25% CaO, 12–16% $Al_2O_3$, 5–10% $B_2O_3$, 0–2% $Na_2O$ and $K_2O$, 0–5% MgO, 0.05–0.4% iron oxide(s), 0–0.8% $TiO_2$, and 0–1% fluorides by weight, and a weave described as: plain; count=w:16.5 ends/cm, f=12.6 ends/cm; weight=0.02 g/cm$^2$; thickness=0.02 cm. The resulting coated glass fabric was then suspended in a convection oven and dried at conditions that prevented cracking of the coating; drying times and temperatures varied with the thickness of the coating as indicated in Table 1. Strips of the coated fabric measuring 1 inch by 8 inches (2.5 cm×20 cm) were then cut from the dried web for later application.

To demonstrate application of the coated fabric strips or swatches to steel substrates at processing temperatures, typically 800°–1500° F. (427°–815° C.), plates of 316 hot-rolled stainless steel available from Allegheny Ludlum Steel Company (Pittsburgh, Pa.) were heated to 1100° F. (593° C.) in a Thermolyne Type 4800 Furnace. The plates were each approximately 6 inches (15 cm) square and ¼ inch (0.6 cm) thick. After reaching the desired temperature, the plates were removed from the furnace, a 1 inch by 8 inch (2.5 cm×20 cm) strip of the above-described coated fabric was quickly applied to the hot steel plate and rolled down with two passes of a 4-pound (1.8-kg) roller, and the plate was returned to the furnace for 30 minutes. The furnace was then turned off and allowed to cool down overnight to room temperature, at which time the samples were examined to evaluate adhesion of the strips to the metal substrate. All examples were tightly fused to the surface of the 316 stainless steel plate.

Examples 13–25

These examples describe the preparation of high temperature labels by applying a coating of lead borosilicate glass powder and pine oil to both fiberglass fabric and an aluminoborosilicate ceramic fabric. Label application to various types of steel is also described.

A coating composition was prepared by mixing lead borosilicate glass powder (product number 83-B, obtained from Mason Color and Chemical Works, Inc., East Liverpool, Ohio) with pine oil in a 3:1 ratio, as described in the above examples. The resulting mixture was then hand spread onto swatches of both the fiberglass cloth (28-T) (approximately 4 inch (10 cm) by 5 inch (13 cm)) described above and woven ceramic fabric (Nextel TM brand 312 ceramic fabric, an aluminoborosilicate, style AF-10, available from 3M Co., St. Paul, Minn.) at a coating weight of about 0.5 g/cm$^2$. The resulting coated fabric swatches were then dried in a convection oven at 194° F. (90° C.) for about 30 minutes.

Individual hot-rolled steel plates of different types (measuring approximately 4.3 inch (11 cm) by 6 inch (15 cm) by ¼ inch (0.6 cm), obtained from Allegheny Ludlum Steel Co., Pittsburgh, Pa.) were placed in a furnace at the temperatures described in Table 2 for periods of time ranging from about 40 minutes to about 2 hours. The plates were removed from the furnace, and the coated fabric swatches were immediately applied by pressing onto the hot steel surfaces.

Each plate with an applied swatch was returned to the furnace for about one hour. The furnace was then turned off, and the furnace and plate were allowed to cool down overnight to room temperature. The plate was removed from the furnace and examined to evaluate adhesion of the swatch to the steel substrate. All swatches adhered to the steel plates.

TABLE 2

| Mason Color 83-B Powder with Pine Oil Vehicle on Steel Substrates | | | |
|---|---|---|---|
| Example Numbers | Fabric Type | Steel Type | Temp (°C.) |
| 13 | fiberglass | 419 | 550 |
| 14 | fiberglass | 419 | 560 |
| 15 | fiberglass | 419 | 760 |
| 16 | ceramic | 444 | 560 |
| 17 | fiberglass | 444 | 560 |
| 18 | fiberglass | 444 | 600 |
| 19 | fiberglass | 444 | 760 |
| 20 | fiberglass | 316 | 570 |
| 21 | fiberglass | 316L | 760 |
| 22 | fiberglass | 309S | 560 |
| 23 | fiberglass | 304S | 700 |
| 24 | fiberglass | 304S | 570 |
| 25 | fiberglass | 304S | 700 |

Examples 26–27

These examples describe the preparation of high temperature labels or tapes by applying a coating of lead borate glass powder, polyvinyl pyrrolidone (PVP) vehicle, glycerol, and water to stainless steel and brass foils. Label application to a stainless steel surface is also described.

A coating composition was prepared by first combining 75 g of Specialty Glass SP-1494 lead borate glass powder with 4.5 g PVP K-90 and 1.5 g PVP K-15 (available from ISP Technologies, Inc., Wayne, N.J.) in a 4-ounce (118 mL) jar, then mixing the resulting combination on a roll mill for 4 hours, and then adding 40 g of deionized water, 0.19 g of a dispersing agent (Darvan TM C, available from R. T. Vanderbilt Co., Inc., Norwalk, Conn.), and 2 g of glycerol to the combination. Five glass beads (0.5 inch (1.3 cm) in diameter) were then added to the resulting slurry, and the slurry was returned to the roll mixer for 18 hours. The slurry was knife coated onto one side of 6 inches (15 cm) wide, 0.002 inch (0.005 cm) thick type 260 brass foil and 5.5 inches (14 cm) wide, 0.002 inch (0.005 cm) thick type 302 stainless steel foil, and the coated foils were dried at 150° F. (66° C.) for 30 minutes.

An approximately 5 inches square (13 cm square), ¼ inch (0.6 cm) thick plate of type 304 hot-rolled stainless steel was heated to 1000° F. (538° C.) in a Thermolyne Model 4800 furnace. After the plate reached the desired temperature, it was removed from the furnace and strips of the dried, coated foils measuring approximately one inch (2.5 cm) by 4 inches (10 cm) long were applied to the hot steel surface. The strips were pressed onto the hot surface for 5 seconds with a trowel covered with heat resistant fabric. The plate was returned to the furnace for 30 minutes and was then allowed to cool slowly by turning off the furnace and keeping the furnace door closed. The strips were examined the next day and were bonded to the steel surface.

Examples 28–30

These examples describe the preparation of high temperature labels or tapes by applying coatings (of (a) pine oil and a fluoride-containing, leadless glass powder or (b) a cellulose ether vehicle, water, and a lead borosilicate glass powder) to fabrics made of fiberglass, aluminoborosilicate, or carbon fiber. Label application to stainless steel is also described.

Coating compositions were prepared by mixing a fluoride-containing, leadless glass powder (3283-2, available from Ferro Corp., Cleveland, Ohio) with pine oil in a 3:1 ratio, and by mixing the above-described 83-B lead borosilicate glass powder with a water soluble cellulose ether vehicle (Methocel TM 20-214, available from Dow Chemical Co., Midland, Mich.) in a ratio of 17.25:1. The compositions were knife coated onto one side of either fiberglass, Nextel TM brand fabric, or carbon fiber fabric (3K-70-P, available from BGF Industries, Altavista, Va.) at a wet coating thickness of 10 mils (250 micrometers), as summarized in Table 3. The coated fabrics were then suspended in a convection oven and dried at 160° F. (71° C.) for 30 minutes. The Nextel TM brand fabric was knife coated a second time to give a second 10-mil (250-micrometer) coating of 3283-2 powder in pine oil. The coated fabric was then dried as before. Strips of the dried coated fabrics measuring 1 inch by 8 inches (2.5 cm × 20 cm) were then cut for later application to hot metal substrates.

The coated fabric strips were applied individually to plates of 316 hot-rolled stainless steel measuring approximately 2 inches by 4 inches by ¼ inch thick (5 cm × 10 cm × 0.6 cm) which had been preheated to 1100° F. (593° C.) in a Thermolyne Type 4800 Furnace. After the coated strips were rolled down with two passes of a 4-pound (1.8-kg) roller, each plate was returned to the furnace for 30 minutes. The furnace was then turned off and allowed to cool overnight to room temperature. The plates were removed from the furnace and examined to evaluate the adhesion of the coated strips. All of the strips but the Nextel TM brand fabric strip were bonded to the stainless steel.

TABLE 3

Bonding of Fiberglass and Carbon Fiber Fabrics

| Example No. | Powder Type | Vehicle Type | Fabric Type |
| --- | --- | --- | --- |
| 28 | 3283-2 | pine oil | fiberglass |
| 29 | 3283-2 | pine oil | C fiber |
| 30 | 83-B | cellulose ether | C fiber |

Example 31

This example describes the preparation of printed high temperature labels.

Alpha-numeric indicia were sequentially printed onto a four inches wide (10 cm) web of fiberglass fabric (28-T) with an impact (daisy wheel) type printer using a standard cloth printer ribbon. Swatches of fabric six inches long (15 cm) were then cut from the web, and one side of each swatch was hand coated with a 3:1 mixture of 83-B powder and pine oil using a wooden tongue depressor. The coated 4 inch by 6 inch (10 cm × 15 cm) swatches were then dried in a convection oven at 200° F. (93° C.) for 30 to 60 minutes. Dry coating weights were approximately 0.28–0.65 grams per square inch (0.043–0.10 g/cm$^2$). At least one of the dried coated swatches was also marked with a Sharpie TM brand permanent marker (available from Sanford Corporation, Bellwood, Ill.) to test the durability of a conventional marking ink at high temperatures. The dried, coated swatches were applied to hot coils of rolled steel at 1191° F., 1031° F., and 848° F. (643° C., 555° C., and 453° C.) and were examined three days later after cool-down. The swatches were bonded to the coils, and both the indicia printed on the swatches and the marking from the Sharpie TM brand marking pen were very legible.

In another case, one side of fiberglass fabric (28-T) was coated with the above-described 3:1 mixture of 83-B powder and pine oil, and the coated fabric was dried for one hour at 194° F. (90° C.). A printing glaze was then prepared by adding 3 grams of red overglaze (#9065, obtained from Mason Color and Chemical Works, Inc., East Liverpool, Ohio) to 10 grams of the above-described 3:1 mixture. A syringe was used to apply the printing glaze to the uncoated surface of the dried coated fabric in patterns of stripes, letters, numbers, and bars (to represent a bar code), and the fabric was then dried again at 194° F. (90° C.) for 30 minutes. The fabric was also marked using a Sharpie TM brand permanent marker. The fabric was then applied by hand to a 3 inch by 5 inch by ¼ inch (7.6 cm × 13 cm × 0.6 cm) piece of 309 hot-rolled stainless steel which had been preheated to 1058° F. (570° C.). The piece of steel was placed in a furnace for an additional hour at 1058° F. (570° C.) and was allowed to slowly cool down over a weekend. The fabric was well-bonded to the steel, and the glaze patterns on the fabric had maintained their integrity of image and were fused into the fabric. The marking from the Sharpie TM brand marker was also legible after heating. A black overglaze (#7800 from Mason Color) was tested in a similar way and also showed good pattern readability.

Example 32

This example describes the preparation of high temperature labels bearing reflective patterns.

Pine oil and 83-B powder were mixed together in a 1:3 ratio and spread by spatula on one side of both fiberglass fabric (28-T greige cloth) and Nextel TM brand ceramic fabric. The coated fabrics were then dried at 194° F. (90° C.) for about 30 minutes. The same mixture was applied in a bar code pattern to the other side of the fabrics using a syringe, and both glass (nD=1.51) and ceramic (nD=1.78) reflective microspheres about 150–250 micrometers in diameter were sprinkled on the wet bar code pattern. The coated, patterned fabric was then dried and applied to a heated (1058° F. (570° C.)) plate of 309 stainless steel in essentially the manner described above. The plate was then returned to the furnace for about 30 minutes. Upon removal from the furnace and cooling, the fabric adhered to the plate, and the bar code pattern was observed to reflect brightly, similarly to reflective sheeting. Examination of the pattern by light microscope (10–50 ×) showed the reflective microspheres to be firmly embedded in the fused powder layer of the bar code pattern.

Examples 33–36

These examples describe the preparation of high temperature labels or tapes by applying to both fiberglass fabric and aluminum foil a coating of lead borate glass powder dispersed in a solution of a polyurethane vehicle in water and propylene glycol. Label application to two different non-metallic surfaces is also described.

A coating composition was prepared by first combining 66 g of deionized water with one drop of a dispersing agent (Darvan TM C, available from R. T. Vanderbilt Co., Inc., Norwalk, Conn., said to be an ammonium polymethacrylate dispersing agent) and 75 g of Specialty Glass SP-1494 lead borate glass powder, then roll milling the resulting combination overnight with glass beads (0.5 inch (1.3 cm) in diameter), and then adding 9 g of a solution of a polyurethane vehicle in a mixture of water and propylene glycol (QR-708 rheology modifier, available from Rohm and Haas, Philadelphia, Pa.). The resulting slurry was stirred for 10 minutes using a paint mixing blade and an air mixer. The slurry was knife coated onto one side of 0.002 inch (0.005 cm) thick, 1145-H18 aluminum foil and onto 28-T fiberglass cloth at a wet coating thickness of 0.015 inch (0.038 cm). The coated foil and cloth were dried in a convection oven at 150° F. (66° C.) for 20 minutes and then cut into strips measuring 1 inch by 1.5 inches (2.5 cm×3.8 cm) for later application to hot surfaces.

Quartz and alumina plates measuring 1.25 inches (3.2 cm) by 5 inches (13 cm) by 0.062 inch (0.16 cm) and 0.03 inch (0.08 cm), respectively, in thickness were heated to 1100° F. (593° C.) in a Thermolyne Model 4800 furnace. When the plates reached the desired temperature, the coated foil and cloth strips were placed on the plates with long-nosed pliers, while leaving the hot plates in the furnace. The strips were then pressed down with a stainless steel ruler for 5 seconds, and the plates were left in the furnace for 30 minutes. The furnace was then turned off and allowed to cool down overnight to room temperature. The plates were then removed from the furnace and examined to evaluate the adhesion of the coated strips. Both the cloth and the foil adhered to both the alumina plate and the quartz plate.

Examples 37-38

These examples describe the preparation of high temperature labels or tapes by applying a coating of lead borate glass powder dispersed in a solution of a polyurethane vehicle in water and propylene glycol to both aluminum foil and a woven fabric. Label application to a glass surface is also described.

A coating composition was prepared by first combining 545 g of deionized water with 1.67 g of a dispersing agent (Darvan TM C, available from R. T. Vanderbilt Co., Inc., Norwalk, Conn., said to be an ammonium polymethacrylate dispersing agent) and 667 g of Specialty Glass SP-1494 lead borate glass powder, then stirring the resulting combination with an impeller driven by an air motor for 5 minutes. This was followed by ultrasonic treatment for 5 minutes to break up agglomerated particles and then by shaking for 5 minutes on a mechanical shaker. Next, 121.7 g of a solution of a polyurethane vehicle in a mixture of water and propylene glycol (QR-708 theology modifier, available from Rohm and Haas, Philadelphia, Pa.) was added to the combination and stirred for 10 minutes using a paint mixing blade and an air mixer. The resulting slurry was knife coated onto one side of 6 inches (15 cm) wide, 0.002 inch (0.005 cm) thick, 1145-H18 aluminum foil and 6 inches (15 cm) wide, 28-T fiberglass cloth. The wet coating thicknesses were 0.015 inch (0.038 cm). The coated foil and coated cloth were dried at 200° F. (93° C.) for 5 minutes.

An approximately 4 inches (10 cm) square, ¼ inch (0.6 cm) thick plate of soda glass was heated to 900° F. (482° C.) in a Thermolyne Model 4800 furnace. After the glass reached the desired temperature, strips of the coated foil and cloth measuring approximately one inch (2.5 cm) in width and 5 inches (13 cm) in length were applied to the surface of the glass plate. The plate was returned to the furnace for 30 minutes. It was then allowed to cool slowly by turning off the furnace and keeping the door closed. The strips were examined the next day and were bonded to the glass surface.

Examples 39-40

These examples describe the preparation of high temperature labels or tapes by applying to a nonwoven paper and to aluminum foil a coating of lead borate glass powder dispersed in a solution of a polyurethane vehicle in water and propylene glycol. The coated foil is heated to provide a fused glass coating. Label application to stainless steel is described.

A coating composition was prepared by first combining 587 g of deionized water with 1.67 g of a dispersing agent (Darvan TM C, available from R. T. Vanderbilt Co., Inc., Norwalk, Conn., said to be an ammonium polymethacrylate dispersing agent) and 667 g of Specialty Glass SP-1494 lead borate glass powder, then stirring the resulting combination with an impeller driven by an air motor for 5 minutes. This was followed by ultrasonic treatment for 5 minutes to break up agglomerated particles and then by shaking for 5 minutes on a mechanical shaker. Next, 80 g of a solution of a polyurethane vehicle in a mixture of water and propylene glycol (QR-708 rheology modifier, available from Rohm and Haas, Philadelphia, Pa.) was added to the combination and stirred for 10 minutes using a paint mixing blade and an air mixer. The resulting slurry was knife coated onto one side of 6 inches (15 cm) wide, 0.002 inch (0.005 cm) thick, 1145-H18 aluminum foil, and the coated foil was dried at 200° F. (93° C.) for 5 minutes. Samples of the coated foil approximately two inches (5.1 cm) square were then heated to 900° F. (482° C.) and held at that temperature to burn off the vehicle and pre-fuse the glass powder. The samples were then allowed to cool to room temperature.

A second coating composition was prepared by combining 40 g of deionized water, 50 g of SP-1494 glass powder, one drop of Darvan TM C, and 9 g of QR-708. The first three ingredients were roll mixed overnight in a 4-ounce (118 mL) jar with glass beads (0.5 inch (1.3 cm) in diameter), and the QR-708 was stirred in with a paint mixing blade on the next day. A thin layer of the resulting combination was spread on an ⅛ inch (0.3 cm) thick nonwoven paper (Fiberfrax TM by Carborundum, Niagara Falls, N.Y., 650 g/m$^2$). The coated paper was dried at 150° F. (66° C.) for 30 minutes.

An approximately 5 inches (13 cm) square, 0.25 inch (0.6 cm) thick plate of type 316 hot-rolled stainless steel was heated to 900° F. (482° C.) in a Thermolyne Model 4800 furnace. After the plate reached the desired temperature, approximately one inch (2.5 cm) square samples of the coated foil and coated nonwoven paper were applied to the steel surface. The plate was returned to the furnace for 30 minutes and then allowed to cool slowly by turning off the furnace and keeping the door closed. The samples were examined the next day and were bonded to the steel surface.

Example 41

This example describes the preparation of high temperature labels or tapes by applying both a pressure sensitive adhesive and a coating of lead borate glass powder dispersed in a solution of a polyurethane vehicle in water and propylene glycol to fiberglass fabric. Label application to stainless steel is also described.

Samples of a silicone pressure sensitive adhesive (#6573, available from General Electric Co., Waterford, N.Y.) were prepared by catalyzing the adhesive with 1% 2,4-dichlorobenzoyl peroxide and then coating the resulting adhesive composition with a knife coater to give a two mil (51 μm) (dry) coating on a six inches (15 cm) wide polyester release liner. The samples were dried in a forced air oven for one minute at 158° F. (70° C.), followed by two minutes at 347° F. (175° C.). The resulting adhesive films were then layered, by folding, to achieve a thickness of 10 mils (250 μm). An approximately one inch (2.5 cm) by two inches (5.1 cm) adhesive film sample was transferred to a swatch of the 28-T style glass cloth described above.

A coating composition was prepared by first combining 50 g of deionized water with 0.15 g of a dispersing agent (Darvan TM C, available from R. T. Vanderbilt Co., Inc., Norwalk, Conn., said to be an ammonium polymethacrylate dispersing agent) and 50 g of Specialty Glass SP-1494 lead borate glass powder, then roll milling the resulting combination for 18 hours with glass beads (0.5 inch (1.3 cm) in diameter). Next, 9 g of a solution of a polyurethane vehicle in water and propylene glycol (QR-708 rheology modifier, available from Rohm and Haas, Philadelphia, Pa.) was added, and the resulting slurry was stirred for 10 minutes using a paint mixing blade and an air mixer. The slurry was coated (using a wooden spatula or tongue blade) onto the 28-T cloth immediately adjacent to the silicone pressure sensitive adhesive, and the coated cloth was dried at 150° F. (65° C.) for 20 minutes.

An approximately 5 inches (13 cm) square, ¼ inch (0.6 cm) thick plate of type 304 hot-rolled stainless steel and a 3 inches (7.6 cm) by 6 inches (15 cm) by 1/16 inch (0.2 cm) thick plate of type 302 bright annealed stainless steel were heated to 700° F. (371° C.) in a Thermolyne Model 4800 furnace. After the plates reached the desired temperature, approximately one inch (2.5 cm) square samples of the dried, coated cloth described above were applied to the hot steel surfaces. Four individual 3 inches (7.6 cm) square type 302 bright annealed plates weighing 160 g altogether were set on top of each sample to assist in bonding. The plates bearing the samples were returned to the furnace for 30 minutes. They were then allowed to cool slowly by turning off the furnace and keeping the door closed. The samples were examined the next day. The sample applied to the type 302 bright annealed stainless steel was bonded (by the pressure sensitive adhesive) to the steel surface, but the sample applied to the type 304 hot-rolled stainless steel did not bond. In each case, the coated glass powder did not fuse and bond to the steel.

Examples 42–46

These examples describe the preparation of high temperature labels or tapes by applying a coating of a mixture of lead borate glass powder and aluminum oxide powder dispersed in a solution of a polyurethane vehicle in water and propylene glycol to fiberglass fabric and to aluminum foil. Label application to stainless steel is also described.

Three coating compositions were prepared by first combining 50 g of deionized water with 0.15 g of a dispersing agent (Darvan TM C, available from R. T. Vanderbilt Co., Inc., Norwalk, Conn., said to be an ammonium polymethacrylate dispersing agent) and 50 g of Specialty Glass SP-1494 lead borate glass powder, and then adding aluminum oxide powder (alumina APA-0.5X, having a particle size in the range from 0.1–1 μm, available from Ceralox Corp., Tucson, Ariz.) to three identical portions of the resulting combination, in differing amounts (one, five, and ten grams of aluminum oxide, respectively). The resulting compositions were then roll milled for 18 hours with five glass beads (0.5 inch (1.3 cm) in diameter) in a 4-ounce (118 mL) jar. Next, 9 g of a solution of a polyurethane vehicle in water and propylene glycol (QR-708 rheology modifier, available from Rohm and Haas, Philadelphia, Pa.) was added to each composition, and the resulting slurries were stirred for 10 minutes using a paint mixing blade and an air mixer. The slurries were knife coated at a 15 mil (380 μm) wet thickness onto the 28-T cloth described above and onto 1100-H19 aluminum foil and dried at 150° F. (66° C.) for 20 minutes.

An approximately 5 inches (13 cm) square, ¼ inch (0.6 cm) thick plate of type 304 hot-rolled stainless steel was heated to 1200° F. (650° C.) in a Thermolyne Model 4800 furnace. After the plate reached the desired temperature, approximately one inch (2.5 cm) wide, six inches (15 cm) long samples of the dried, coated fabric and foil were applied to the hot steel surface. The plate was returned to the furnace for 30 minutes. The samples were then allowed to cool slowly by turning off the furnace and keeping the door closed. The samples were examined the next day. All of the samples but the one prepared with ten grams of aluminum oxide and coated onto aluminum foil were bonded to the steel.

Examples 47–49

These examples describe the preparation of high temperature labels or tapes by applying a coating of lead borate glass powder dispersed in a solution of a polyurethane vehicle in water and propylene glycol to aluminum foil. Label application to aluminum, brass, and oxidized copper surfaces is also described.

A coating composition was prepared by first combining 587 g of deionized water with 1.67 g of a dispersing agent (Darvan TM C, available from R. T. Vanderbilt Co., Inc., Norwalk, Conn.) and 667 g of Specialty Glass SP-1494 lead borate glass powder, then stirring the resulting combination with an impeller driven by an air motor for 5 minutes. This was followed by ultrasonic treatment of the combination for 5 minutes to break up agglomerated particles, and then by shaking for 5 minutes on a mechanical shaker. Next, 80 g of a solution of a polyurethane vehicle in water and propylene glycol (QR-708 rheology modifier, available from Rohm and Haas, Philadelphia, Pa.) was added to the combination, and the resulting slurry was stirred for 10 minutes using a paint mixing blade and an air mixer. The slurry was knife coated onto one side of 6 inches (15 cm) wide, 0.002 inch (0.005 cm) thick, 1145-H18 aluminum foil, and the coated foil was dried at 200° F. (93° C.) for 5 minutes.

Plates of 6061 aluminum and 110 copper alloys were heated to 875° F. (468° C.) and a plate of 260 brass was heated to 1000° F. (538° C.) in Thermolyne Model 4800 furnaces. (The aluminum plates were approximately 2 inches (5.1 cm) by 3.5 inches (8.9 cm) by ¼ inch (0.6 cm) thick. The brass plates were 2 inches (5.1 cm) by 6 inches (15 cm) by ⅛ inch thick (0.3 cm). The copper plate was 2.25 inches (5.72 cm) by 1.75 inches (4.45 cm) by ⅛ inch thick (0.3 cm).) The copper plate was covered with a black oxide coating when it was removed from the furnace. Strips (measuring approximately 0.75 inch (1.9 cm) by 2 inches (5.1 cm)) of the dried, coated foils were then applied to the plates. The strips were pressed down with a trowel covered with a high temperature fabric for 5 seconds, and all of the plates were then returned to the furnace for 30 minutes. Three type 302 bright annealed stainless steel panels (weighing 120 g altogether) were set on top of the strip applied to the copper plate so as to cover approximately ⅔ of the strip. This was done to promote adhesion to the irregular, oxidized surface. The plates were allowed to cool slowly by turning off the furnace and keeping the furnace door closed. The strips were examined the next day and were bonded to each of the surfaces tested.

Various modifications and alterations of this invention will become apparent to those skilled in the art without departing from the scope and spirit of this invention.

We claim:

1. A sheet comprising
   (a) a backing material which is thermally stable at its application temperature and which bears a reflective pattern; and
   (b) a coating on at least a portion of at least one major surface of said backing material, said coating consisting essentially of fused or fusible particles selected from the group consisting of glass particles, ceramic particles, and mixtures thereof.

2. The sheet of claim 1 wherein said backing material is conformable.

3. The sheet of claim 1 wherein said backing material is printable.

4. The sheet of claim 3 having printed indicia thereon.

5. The sheet of claim 1 wherein said backing material is selected from the group consisting of metal foil and inorganic fabric.

6. The sheet of claim 5 wherein said metal foil is selected from the group consisting of aluminum, aluminum alloys, copper, copper alloys, and iron alloys.

7. The sheet of claim 5 wherein said inorganic fabric is selected from the group consisting of fiberglass fabric, carbon fabric, and ceramic fabrics formed from aluminoborosilicate fibers, aluminosilicate fibers, alumina fibers, and mixtures thereof.

8. The sheet of claim 1 wherein said fused or fusible particles are selected from the group consisting of glass particles and mixtures of glass particles and ceramic particles.

9. The sheet of claim 8 wherein said glass particles are selected from the group consisting of lead aluminoborosilicate, lead borosilicate, bismuth borosilicate, lead borate, zinc borosilicate, and mixtures thereof.

10. The sheet of claim 8 wherein said ceramic particles are selected from the group consisting of alumina, zirconia, titania, silicon carbide, aluminum nitride, and mixtures thereof.

11. The sheet of claim 1 wherein said coating further contains a non-pressure sensitive adhesive vehicle.

12. The sheet of claim 11 wherein said non-pressure sensitive adhesive vehicle is selected from the group consisting of methyl cellulose, polyvinyl alcohol, polyvinyl pyrrolidone, polyethylene glycol, pine oil, hot melt waxes, organic salts, and mixtures thereof.

13. The sheet of claim 1 borne on a liner.

14. The sheet of claim 1 wherein said application temperature is above about 400° C.

15. The sheet of claim 1 which is further coated on at least a portion thereof with a material which functions as a heat-activatable adhesive or as a pressure sensitive adhesive at temperatures below the softening point of said fusible particles.

16. The sheet of claim 1 in the form of a label.

17. A tape comprising
   (a) a roll of a flexible, elongate backing material which is thermally stable at its application temperature; and
   (b) a coating on at least a portion of at least one major surface of said backing material, said coating consisting essentially of fused or fusible particles selected from the group consisting of glass particles, ceramic particles, and mixtures thereof.

18. The tape of claim 17 borne on a liner.

19. A high temperature label comprising
   (a) a backing material which is selected from the group consisting of aluminum foil and fiberglass fabric and which bears a reflective pattern; and
   (b) a coating on at least a portion of at least one major surface of said backing material, said coating consisting essentially of a fused or fusible lead borosilicate glass powder.

20. An article useful as a label applicable to a substrate at high temperature comprising
   (a) a backing material which is thermally stable at said high temperature; and
   (b) a coating on at least a portion of at least one major surface of said backing material, said coating consisting of fused or fusible particles selected from the group consisting of glass particles, ceramic particles, and mixtures thereof, wherein said fused or fusible particles fuse at said high temperature and secure said article to said substrate.

21. The article of claim 20 wherein said high temperature is above about 400° C.

22. The sheet of claim 1 wherein said coating consists of said fused or fusible particles.

* * * * *